(12) United States Patent
Park

(10) Patent No.: US 6,434,093 B2
(45) Date of Patent: Aug. 13, 2002

(54) APPARATUS AND METHOD FOR CONTROLLING TRACKING FOR OPTICAL RECORDING/REPRODUCING APPARATUS

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 09/742,218

(22) Filed: Dec. 22, 2000

(30) Foreign Application Priority Data

Dec. 23, 1999 (KR) .......................................... 1999-61260
Nov. 30, 2000 (KR) .......................................... 2000-71989

(51) Int. Cl.[7] ................................................. G11B 7/00
(52) U.S. Cl. ................................ 369/44.25; 369/44.29; 369/59.19; 369/124.15
(58) Field of Search .......................... 369/44.11, 44.25, 369/44.28, 44.29, 44.32, 44.34, 44.35, 44.36, 44.41, 47.1, 47.23, 47.25, 53.1, 59.15, 59.17, 124.1, 124.15

(56) References Cited

U.S. PATENT DOCUMENTS 5,307,333 A  *  4/1994   Ikeda et al. .............. 369/44.28
5,592,456 A  *  1/1997   Miyahsita et al. ....... 369/59.18
6,249,496 B1 *  6/2001   Tsukahara et al. ....... 369/44.28

* cited by examiner

*Primary Examiner*—Muhammad Edun
(74) *Attorney, Agent, or Firm*—Birch, Stewart, Kolasch & Birch, LLP

(57) ABSTRACT

An apparatus and method for controlling tracking for an optical recording/reproducing apparatus is disclosed. A track center level is determined at a point where a high width of a TE signal generated during free-running or traverse is equal to its low width. Alternatively, a TE detection level at a TZC point of the TE signal in which asymmetry is adjusted is determined as the track center level. The determined track center level is used for normal recording/reproduction, so that the tracking servo is activated at the actual track center position. Thus, initial stable tracking performance can be obtained, and bias of the tracking can be avoided during tracking control by estimating the exact track center value.

20 Claims, 7 Drawing Sheets

APPARATUS AND METHOD FOR CONTROLLING TRACKING FOR OPTICAL RECORDING/REPRODUCING APPARATUS

BACKGROUND OF THE INVENTION

1. Field of the Invention

The present invention relates to an apparatus and method for controlling tracking for an optical recording medium, and more particularly to an apparatus and method for controlling tracking detecting an exact track center value from an optical recording/reproducing apparatus.

2. Description of the Related Art

Generally, an optical recording medium system, i.e., an optical recording/reproducing apparatus reproduces data recorded in an optical disc or records data in the optical disc using the optical disc, such as compact disc (CD) and digital versatile disc (DVD), as a recording medium.

At this time, a rewritable optical disc, particularly, DVD-RAM includes a signal track of a land and groove structure, and respectively records an information signal in tracks of the land and the groove to increase recording density.

FIG. 1 is a block diagram illustrating the construction of a typical apparatus for recording and reproducing data on the optical recording medium. Referring to FIG. 1, an optical disc 101 includes a signal track of a land and groove structure. Data can be recorded or reproduced in a track of the land or the groove, or both tracks thereof. An optical pickup 102 places an optical beam condensed on an object lens on a signal track of the optical disc 101 under the control of a servo control unit 106, and makes the optical beam reflected from a signal recording surface of the track condensed on the object lens and incident upon an optical detector (not shown) to detect a focus error signal and a tracking error (TE) signal. The optical detector is composed of several optical detecting elements, and electric signals in proportion to quantities of light obtained by the respective optical detecting elements are output to a radio frequency (RF) and servo error generating unit 104.

The RF and servo error generating unit 104 generates an RF signal required for data reproduction from the electrical signals output from the optical detector, a focus error (FE) signal and a (TE) signal for servo control. At this time, the RF signal is output to a decoder 105 for data reproduction, the servo error signal such as FE and TE to a servo control unit 106, and the control signal for data recording to an encoder 103.

The encoder 103 encodes the data to be recorded to recording pulses of a format required by the optical disc 101, and records the encoded pulses on the optical disc 101 through the optical pickup 102. The decoder 105 restores the data of the original form from the RF signal.

Meanwhile, a host such as a personal computer (PC) may be connected to the optical disc recording/reproducing apparatus. This host transmits a recording/reproducing command to a microcomputer 111 through an interface 110, transmits the data to be recorded to the encoder 103, and receives reproduced data from the decoder 105. The microcomputer 111 controls the encoder 103, the decoder 105, and the servo control unit 106 in accordance with the recording/reproducing command from the host.

At this time, an advanced technology attached packet interface (ATAPI) is typically used as the interface 110. Specifically, the ATAPI is the interface standard between the host and the optical recording/reproducing apparatus such as a CD or DVD driver proposed to transmit the data decoded by the optical recording/reproducing apparatus to the host, and serves to convert the decoded data into a protocol of a data packet that can be processed in the host and transmit the data packet.

Meanwhile, the servo control unit 106 processes the focus error signal (FE), and outputs a driving signal for focusing control to a focus servo driving unit 107. The servo control unit 106 also processes the tracking error (TE) signal, and outputs a driving signal for tracking control to a tracking servo driving unit 108. Also, the servo control unit 106 generates a track zero crossing (TZC) signal switched on/off at a zero cross point of the tracking error (TE) signal. The TZC signal is used as various reference signals, and as an example, the TZC signal may be used as a reference signal which determines a kick pulse, a brake pulse, and brake-on time during seeking operation.

The focus servo driving unit 107 moves the optical pickup 102 up and down by driving a focus actuator in the optical pickup 102, so that the optical pickup 107 traces the movement of the rotating optical disc 101.

The tracking servo driving unit 108 moves the object lens of the optical pickup 102 in a radial direction by driving a tracking actuator in the optical pickup 102, so that the object lens adjusts the position of the optical beam, and traces a predetermined track.

At this time, the optical beam should trace the center of the track. If the optical beam deviates from the track center, the tracking actuator fails to trace the track center. In this case, the tracking servo fails to trace a corresponding track, thereby resulting in that the tracking servo may be inactivated. This makes the recording/reproduction of the data difficult.

It is essentially necessary to estimate DC level of the tracking error for exact tracking control. This is because that DC components of the tracking error directly cause deviation of the track.

Accordingly, in the typical optical recording/reproducing apparatus, the track center is first traced when the tracking servo starts. There may be various methods for tracing the track center. As one example, there is a method for estimating a traverse center value as a track center value when the tracking servo starts. That is, a DC-offset of the tracking error becomes an error value of the estimated traverse center. As another example, there is a method for estimating a peak-to-peak center of the TE signal as shown in FIG. 2. That is, as shown in FIG. 2, the peak-to-peak center of the TE signal (TEVpp), i.e., potential level of V1=V2 is set as the track center, and the tracking control is performed based on the set track center.

However, signals of the optical detector may vary due to characteristic difference of the optical detector for detecting reflecting light from the optical disc or in case that the optical detector is wrongly designed. If the TE signal is detected by such an optical detector, the TE signal may be generated asymmetrically as shown in FIG. 2.

At this time, the traverse center or the potential level of V1=V2 is not an actual track center. Other point acts as a track center.

In case that the tracking servo starts using the estimated track center value as above, a risk may arise in that tracking control starts at a point where an optical head is deviated from the track excessively. In this case, it is not possible to obtain initial stable tracking performance due to excessive response characteristic caused by the excessive tracking error.

Accordingly, to set a proper tracking servo starting point, the exact track center value is required. Particularly, if the tracking is activated in a portion not the track center, recording is performed in a wrong position. For this reason, the RF signal becomes smaller and jitter characteristic is degraded. Particularly, recording characteristic is degraded.

SUMMARY OF THE INVENTION

Accordingly, the present invention is directed to an apparatus and method for controlling tracking for an optical recording/reproducing apparatus that substantially obviate one or more of the problems due to limitations and disadvantages of the related art.

An object of the present invention is to provide an apparatus and method for controlling tracking for an optical recording/reproducing apparatus, in which a track center value is estimated from a TE signal generated during free-running or traverse to control tracking.

Another object of the present invention is to provide an apparatus and method for controlling tracking for an optical recording medium, in which a track center value is estimated from a TZC signal generated after adjusting asymmetry of a TE signal.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a method for controlling tracking for an optical recording medium according to the present invention includes the steps of varying and slicing a slice level for a TE signal detected at the time when recording and reproduction of a normal state are not performed, determining a slice level as a track center level a point where a high width of the sliced signal is equal to a low width thereof, and utilizing the determined track center level in recording and reproduction of a normal state.

The slicing step is characterized in that slicing is performed for only a TE signal greater than a constant frequency.

The recording and reproducing step is characterized in that a tracking servo is turned on in the determined track center.

The recording and reproducing step is also characterized in that the tracking servo is performed with compensating for a difference between a level of the determined track center and a peak-to-peak center level of the TE signal.

The recording and reproducing step is further characterized in that the tracking servo is performed with compensating for a difference between a level of the determined track center and a traverse center level of the TE signal.

In another aspect, a method for controlling tracking for an optical recording/reproducing apparatus according to the present invention includes the steps of adjusting asymmetry of a TE signal detected at the time when recording and reproduction of a normal state are not performed, determining a level of the TE signal detected at a TZC point of the adjusted TE signal as a track center level, and utilizing the determined track center level in the recording and reproduction of a normal state.

The adjusting step includes the steps of DC coupling the TE signal, biasing the DC coupled TE signal at a reference voltage, and slicing the biased TE signal at the reference voltage.

The reference voltage is a servo reference voltage.

In another aspect, an apparatus for controlling tracking for an optical recording/reproducing apparatus according to the present invention includes a slicing unit for varying and slicing a slice level for a TE signal detected at the time when recording and reproduction of a normal state are not performed, a servo control unit for determining a slice level as a track center level at a point where a high width of the sliced signal is equal to a low width thereof and obtaining tracking offset to be adjusted, and a tracking servo driving unit for utilizing the track center level determined by the servo control unit and the TE signal in which the tracking offset is adjusted.

In other aspect, an apparatus for controlling tracking for an optical recording/reproducing apparatus according to the present invention includes an asymmetrical adjusting unit for adjusting asymmetry of a TE signal detected at the time when recording and reproduction of a normal state are not performed, a servo control unit for setting a level of the TE signal detected at a TZC point of the adjusted TE signal as a track center level and obtaining a tracking offset to be adjusted, and a tracking servo driving unit for utilizing the track center level determined by the servo control unit and the TE signal, in which the tracking offset is adjusted, in the recording and reproduction of a normal state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings:

FIG. 5a is a waveform illustrating an example of a track center level detected in accordance with the present invention when a TE signal is asymmetrically generated;

FIG. 5b is a waveform illustrating an example of a TZC signal generated by slicing the TE signal of FIG. 5a;

DETAILED DESCRIPTION OF THE PREFERRED EMBODIMENTS

Reference will now be made in detail to the preferred embodiments of the present invention, examples of which are illustrated in the accompanying drawings.

A method for determining a track center according to the present invention will be described with reference to the first and second embodiments.

First Embodiment

In the first embodiment of the present invention, it is intended that a TZC signal is generated simultaneously with varying a slice level of a TE signal generated during free-running or traverse, and a voltage level is set as a track center level at a point where a high width of the TZC signal is equal to a low width thereof.

Figure 1:
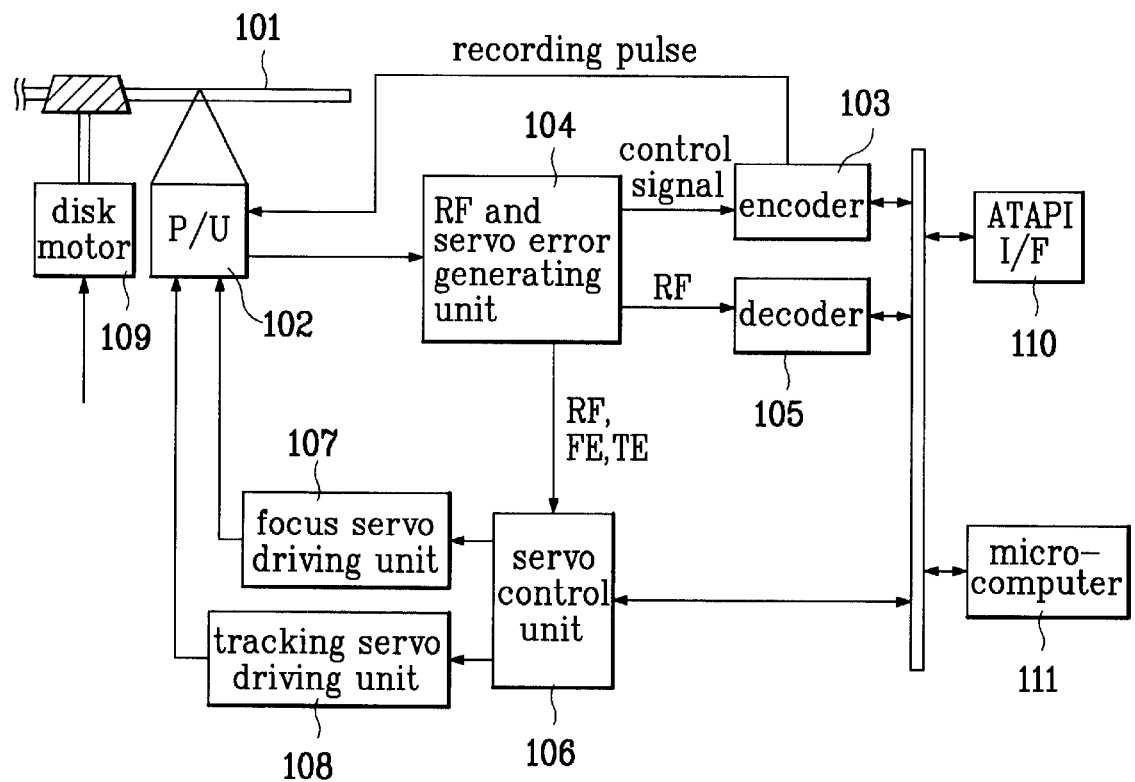
FIG. 1 is a block diagram illustrating the construction of a typical optical recording/reproducing apparatus.
Figure 2:
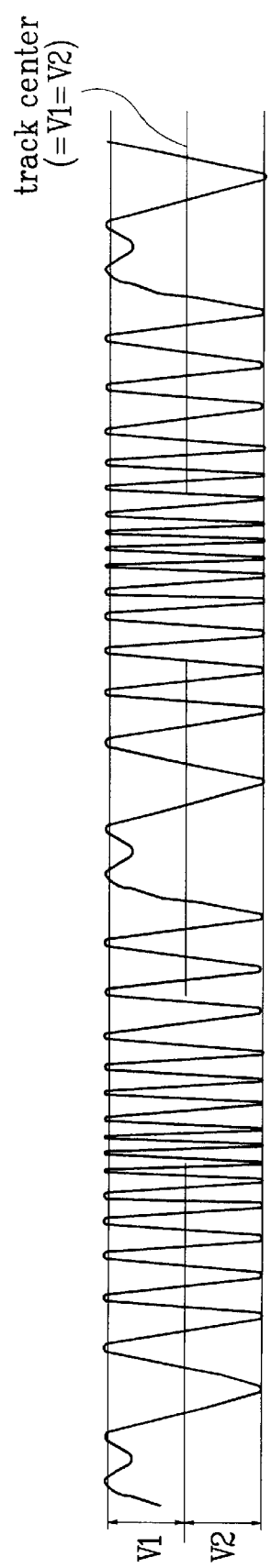
FIG. 2 is a waveform illustrating an example of a track center level typically detected when a TE signal is asymmetrically generated.
Figure 3:
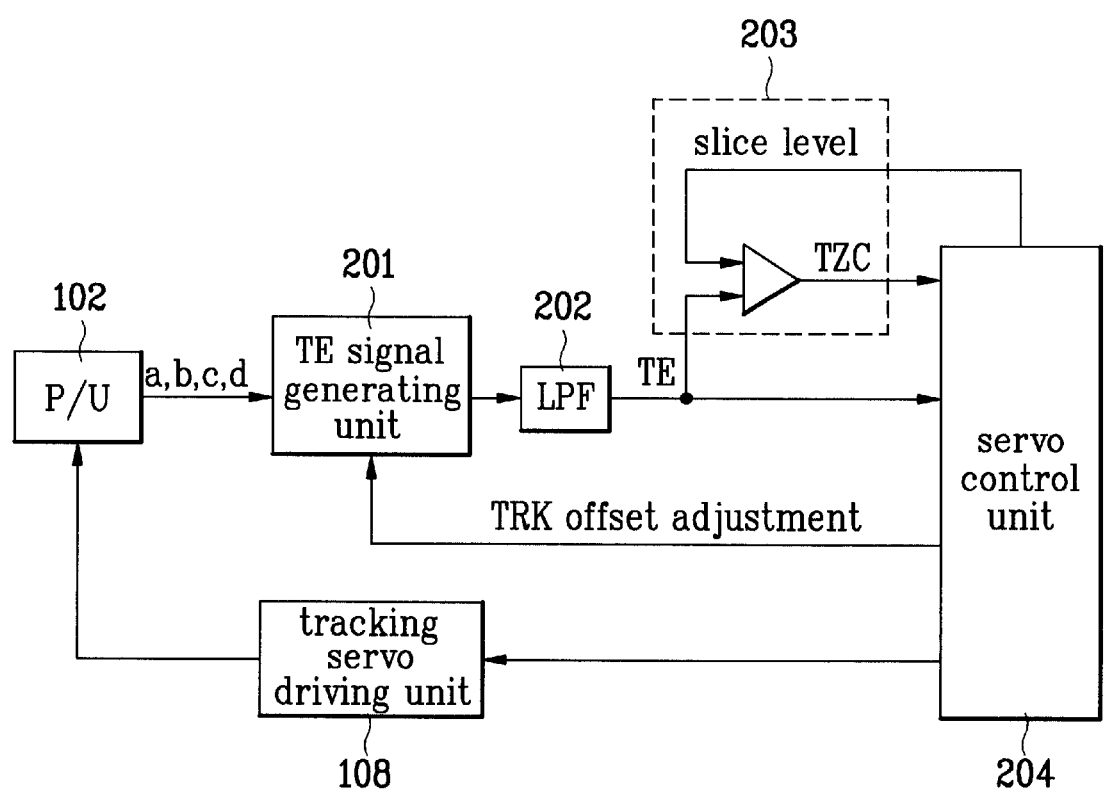
FIG. 3 is a block diagram illustrating a tracking control of an optical recording/reproducing apparatus according to the first embodiment of the present invention.

FIG. 3 is a block diagram illustrating a tracking control of an optical recording/reproducing apparatus according to the first embodiment of the present invention.

Referring to FIG. 3, the optical recording/reproducing apparatus includes a TE signal generating unit 201 for receiving electrical signals a, b, c and d output in proportional to quantities of light reflected by an optical detector in an optical pickup to generate a TE signal, a low pass filter (LPF) 202 for low pass filtering the TE signal generated by the TE signal generating unit 201, a TZC signal generating unit 203 for generating a TZC signal by slicing the low pass filtered TE signal at a variable slice level, a servo control unit 204 for generating a tracking offset adjusting signal after detecting a track center from the output of the TZC signal generating unit 203 to output the tracking offset adjusting signal to the TE signal generating unit 201 and at the same time generating a tracking driving signal from the TE signal to output the tracking driving signal to a tracking servo driving unit 108, and a tracking servo driving unit 108 for performing tracking servo by the tracking driving signal in a track center detected by the servo control unit 204.

Figure 4:
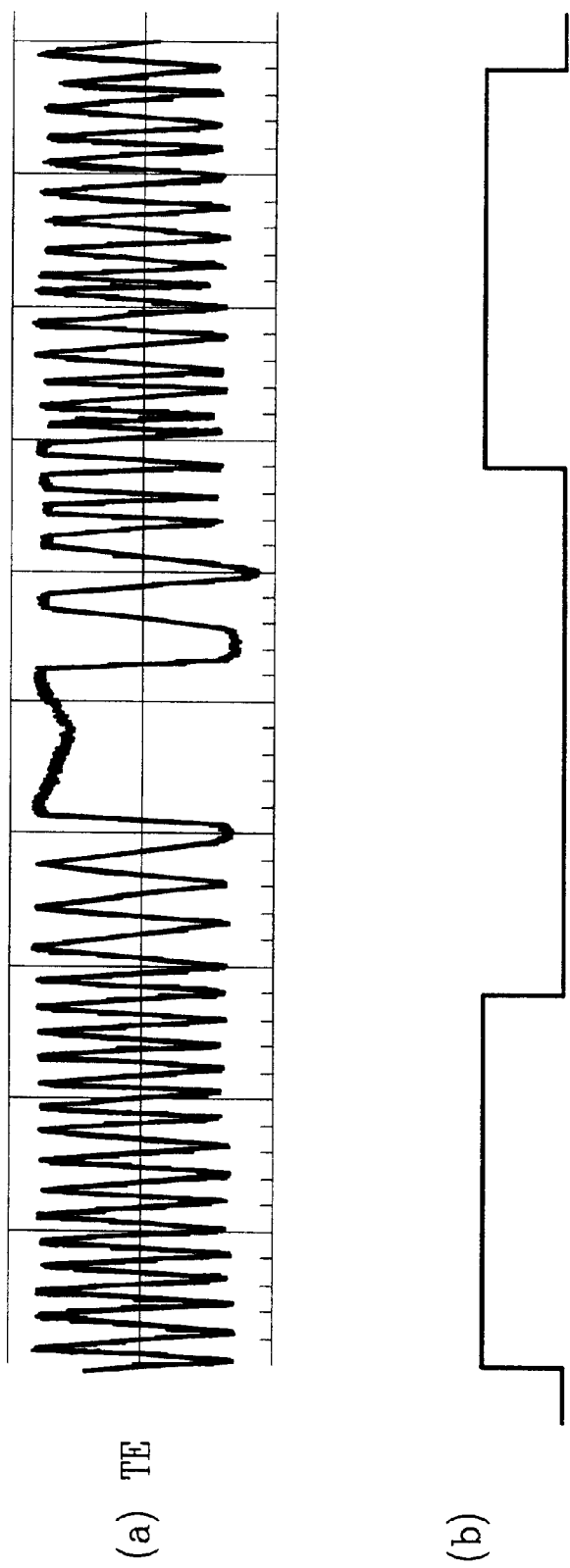
FIG. 4a is a waveform illustrating an example of a TE signal generated during free-running or traverse in which focus is only controlled.
FIG. 4b is a waveform illustrating an example of a window processed TE signal used to trace a track center according to the present invention.

FIG. 4a is a waveform illustrating an example of a TE signal generated during free-running or traverse in which a focus servo is only activated. This TE signal is generated by moving an optical head from a land to a groove and vice versa by a disc eccentricity (or movement of the optical head). If track moving speed of the optical head is constant, time interval between tracking centers is equal. Considering this principle, a voltage level becomes a track center level at a point where a high width of the TE signal is equal to a low width thereof. That is, a point, where T1 is equal to T2 (T1=T2) between TZC points when a track is crossed, is the center of a track.

Accordingly, in the first embodiment of the present invention, a TZC signal is generated simultaneously with varying a slice level of the TE signal generated during free-running or traverse, and a slice level, i.e., a voltage level is set as a track center level at the point where the high width of the TZC signal (or TE signal) is equal to a low width thereof. To this end, the TE signal of FIG. 5a as generated by the TE signal generating unit 201 is output to the TZC signal generating unit 203 and the servo control unit 204 by eliminating its glitch through low pass filtering by the LPF 202.

Figure 5:
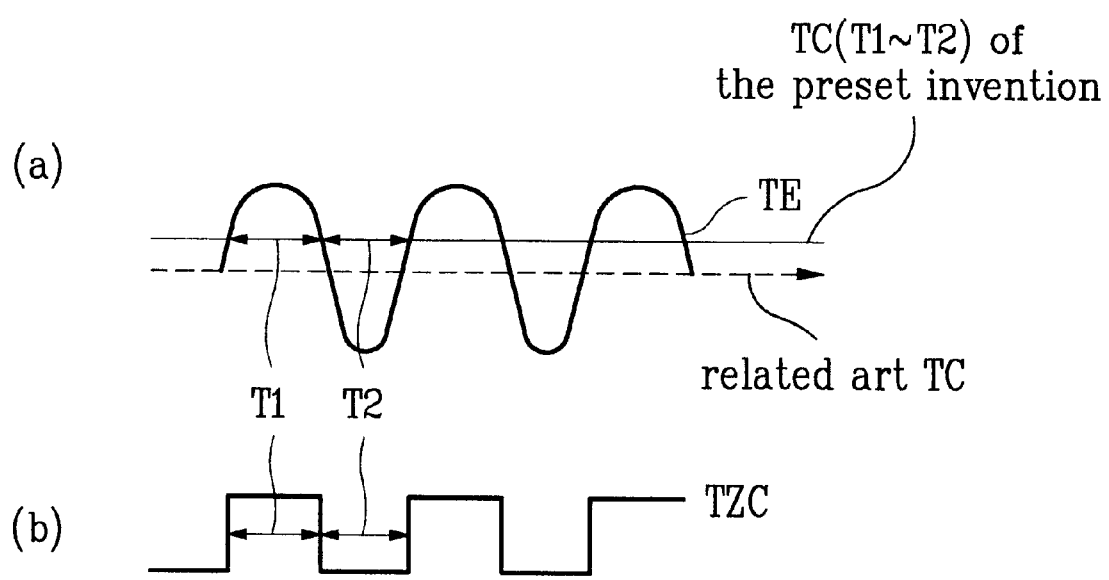

The TZC signal generating unit 203 is a kind of a comparator, and slices the TE signal at a slice level output from the servo control unit 204 as shown in FIG. 5b and then outputs the TE signal to the servo control unit 204.

The servo control unit 204 varies the slice level up and down until the high width of the TZC signal output from the TZC signal generating unit 203 is equal to the low width, and then outputs the slice level to the TZC signal generating unit 203.

If the high width of the TZC signal is equal to the low width (T1=T2), the slice level at that time is determined as a track center level as shown in FIG. 5b.

At this time, the TE signal only in an orthogonal portion due to eccentricity, i.e., a high frequency portion where the frequency is almost constant as shown in a high period of FIG. 4b is sampled and sliced. This is because that the frequency and size of the TE signal are almost constant in the high frequency portion. In a low frequency portion, for example, in a low period of FIG. 4b, the probability of T1=T2 is small. Accordingly, the low frequency portion is excluded from the track center level.

As shown in FIG. 5a, if asymmetry is generated in the TE signal, a difference between the track center level of the present invention and the related art track center level occurs. Accordingly, it is necessary to compensate the difference during tracking servo so that the track center can be traced exactly. To this end, the servo control unit 204 checks the potential of the track center (T1=T2) detected in the first embodiment of the present invention during tracking servo and the potential(ex, the potential of the traverse center or V1=V2) of the related art track center, so as to output a tracking offset to be adjusted to the TE signal generating unit 201. That is, the servo control unit 204 outputs the potential difference between the track center of the present invention and the related art track center(traverse center or V1=V2) to the TE signal generating unit 201 as an offset value.

The TE signal generating unit 201 compensates the TE signal as much as the tracking offset and then the compensated TE signal to the TZC signal generating unit 203 and the servo control unit 204 through the LPF 202. The servo control unit 204 generates a tracking driving signal from the compensated TE signal and then outputs it to the tracking servo driving unit 108. When the tracking servo driving unit 108 performs tracking servo by the tracking driving signal, the optical beam can exactly trace the track center. That is, when the tracking servo is activated after adjusting the tracking offset, the optical beam can exactly trace the track center.

At this time, the tracking servo driving unit 108 starts tracking servo in the track center when the tracking servo is activated after finishing free-running or traverse. Namely, the tracking servo driving unit 108 uses the track center value as the tracking servo starting point when the tracking servo is activated after finishing free-running or traverse. Thus, the tracking servo can start in the exact track center position.

Since the track center level is a point where the optical head passes through the center of the track, relatively small excessive response characteristic can be obtained if the tracking servo driving unit 108 is driven at the tracking center level. Accordingly, stable initial control performance can be obtained.

Second Embodiment

In the second embodiment of the present invention, it is intended that asymmetry of a TE signal is adjusted and then a TZC signal is generated from the TE signal, and a TE detection level at the TZC point is set as an actual track center level.

Figure 6:
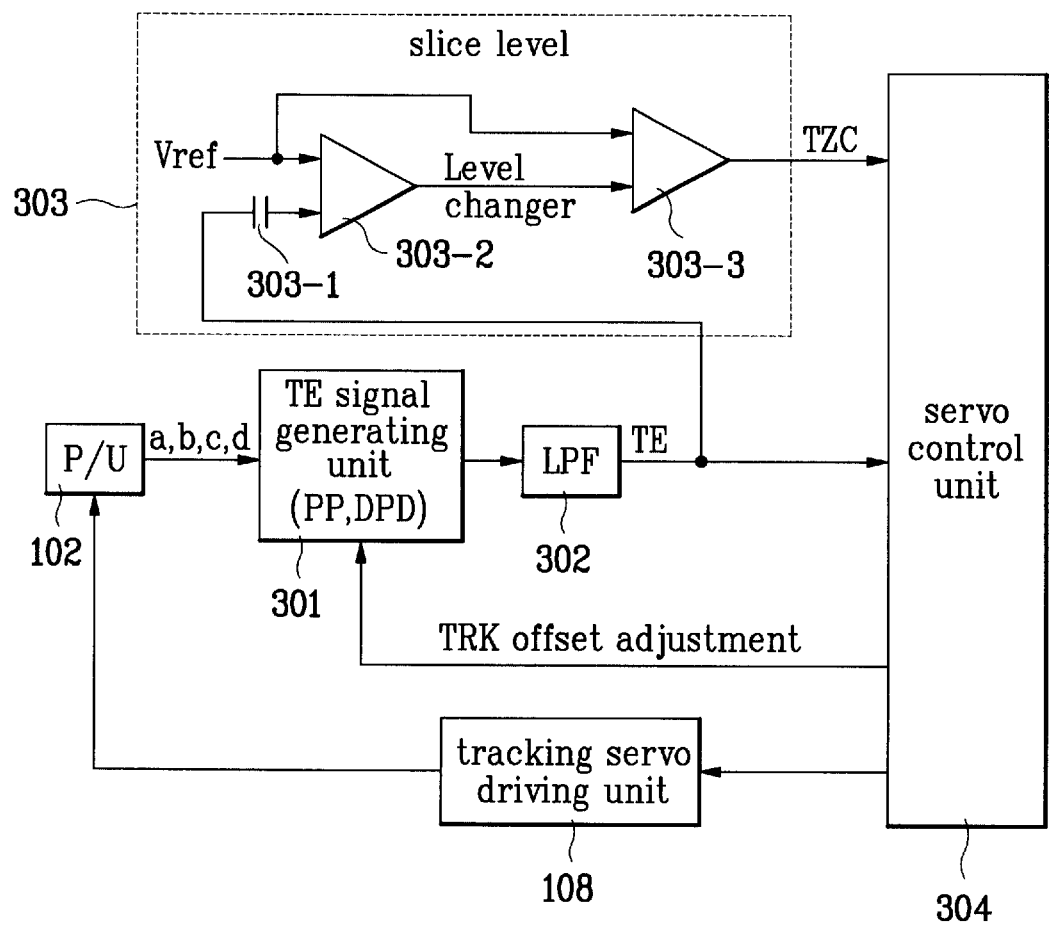
FIG. 6 is a block diagram illustrating a tracking control of an optical recording/reproducing apparatus according to the second embodiment of the present invention.

FIG. 6 is a block diagram illustrating tracking control of an optical recording/reproducing apparatus according to the second embodiment of the present invention.

Referring to FIG. 6, the optical recording/reproducing apparatus includes a TE signal generating unit 301 for generating a TE signal from electrical signals a, b, c and d output in proportional to quantities of light reflected by an optical detector in an optical pickup 102, a LPF 302 for low pass filtering the TE signal, an asymmetric adjusting unit 303 for compensating asymmetry of the low pass filtered TE signal to generate a TZC signal, and a servo control unit 304 for determining a track center from the TZC signal generated by the asymmetric adjusting unit 303 and generating a tracking offset adjusting signal to output the tracking offset adjusting signal to the TE signal generating unit 301 and at the same time generating a tracking driving signal from the TE signal to output the tracking driving signal to a tracking servo driving unit 108.

The asymmetric adjusting unit 303 includes a capacitance 303-1 for DC coupling the low pass filtered TE signal, a buffer 303-2 for biasing the DC coupled TE signal at a reference voltage Vref, and a comparator 303-3 for slicing the output of the buffer 303-2 at the reference voltage Vref to generate the TZC signal.

Here, the reference voltage may vary depending on designers. In the present invention, a servo reference voltage is used as an example.

In the aforementioned second embodiment of the present invention, after asymmetry of the TE signal is adjusted, the TZC signal is generated from the tracking error signal, and a tracking error detection level at a TZC point of the TZC signal is determined as an actual track center level. To this end, the TE signal generated by the TE signal generating unit 301 is output to the asymmetric adjusting unit 303 and the servo control unit 304 by eliminating its glitch through low pass filtering by the LPF 302.

At this time, the capacitance 303-1 of the asymmetric adjusting unit 303 performs DC coupling of the low pass filtered TE signal and outputs the DC coupled TE signal to the buffer 303-2. The buffer 303-2 biases the DE coupled TE signal at the reference voltage Vref. That is, asymmetry of the TE signal is adjusted while loading the AC level of the TE signal in the reference voltage Vref. This means that a DC level is changed in a direction, where upper and lower areas of the TE signal are equal to each other, based on the reference voltage Vref(servo reference) as shown in FIG. 7b (A=B).

Figure 7:
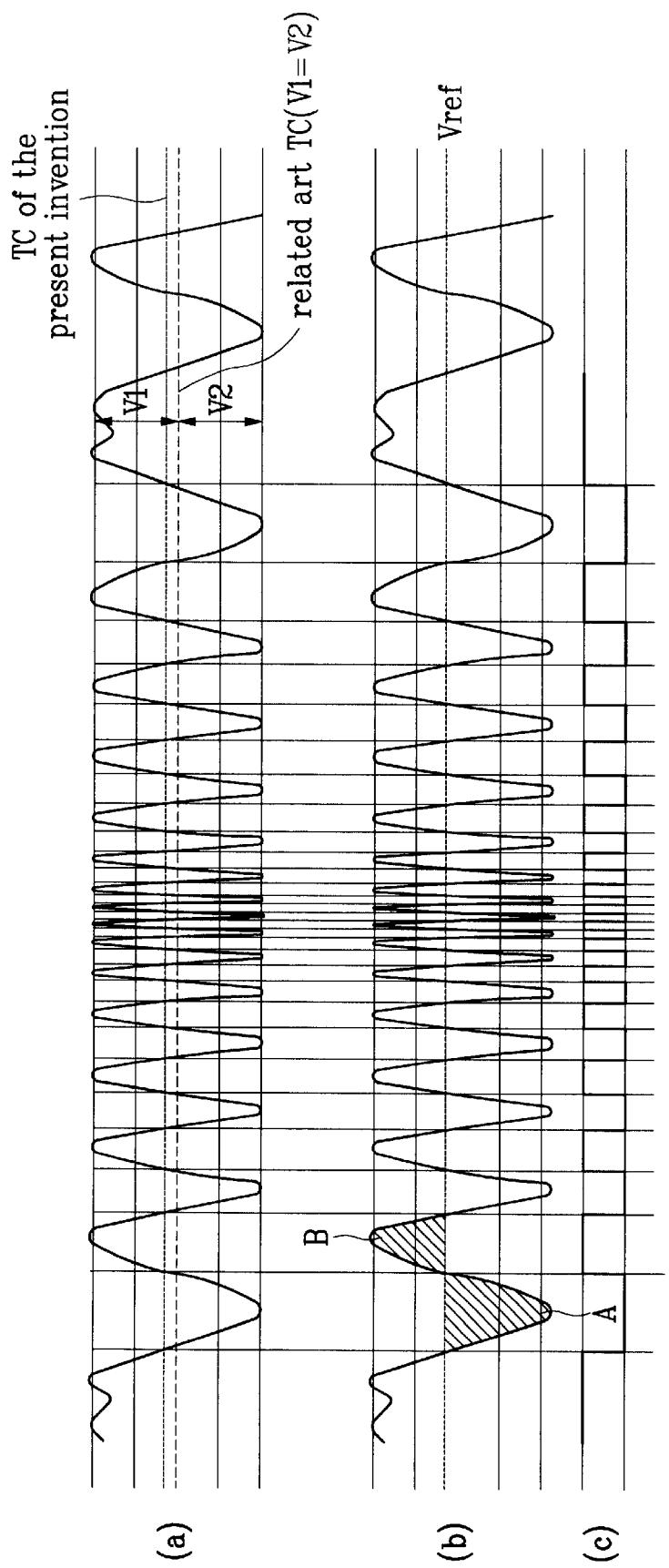
FIG. 7a is a waveform illustrating a difference between a track center level of the present invention and a related art track center level when a TE signal is asymmetrically generated.
FIG. 7b is a waveform illustrating an example of a TE signal in which asymmetry is adjusted.
FIG. 7c is a waveform illustrating a TZC signal detected from the TE signal of FIG. 7b.

The TE signal, in which asymmetry is adjusted in the buffer 303-2 as shown in FIG. 7b, is output to the comparator 303-3. The comparator 303-3 slices the TE signal at the reference voltage Vref to detect the TZC signal as shown in FIG. 7c, and outputs the TZC signal to the servo control unit 304. That is, the TZC signal is switched on/off at the track cross point, and the TE signal is sliced at a fixed servo reference voltage.

In the second embodiment of the present invention, the slice level for generating the TZC signal is fixed at the servo reference voltage. The servo control unit 304 determines the TE detection level at the TZC point of the TZC signal as the track center level.

At this time, as shown in FIG. 7a, if asymmetry is generated in the TE signal, the difference between the track center level of the present invention and the related art track center level occurs. Accordingly, it is necessary to compensate this difference during tracking servo, so that the track center can exactly be traced.

To this end, the servo control unit 304 checks the potential (ex, the potential of the traverse center or V1=V2) of the track center traced in the TZC point during tracking servo and the track center detected from the low pass filtered TE signal, so as to output a tracking offset to be adjusted to the TE signal generating unit 301.

The TE signal generating unit 301 compensates the TE signal as much as the tracking offset and then the compensated TE signal to the asymmetric adjusting unit 303 and the servo control unit 404 through the LPF 302. The servo control unit 304 generates a tracking driving signal from the compensated TE signal and then outputs it to the tracking servo driving unit 108.

The tracking servo driving unit 108 starts tracking servo in the track center by the tracking driving signal. Accordingly, the optical beam can exactly trace the track center.

As described above, when the track is activated after adjusting the tracking offset, the optical beam can exactly trace the track center. That is, the tracking servo driving unit 108 can start tracking servo in the exact track center position when the tracking servo is activated after finishing free-running or traverse.

In the second embodiment, since the track center level is a point where the optical head passes through the center of the track, relatively small excessive response characteristic can be obtained if the tracking servo driving unit 108 is driven at the track center level. Accordingly, stable initial control performance can be obtained.

As described above, although the method for determining the track center of the first embodiment is different from the method of the second embodiment, the voltage level, in which the high width of the TE signal is equal to its low signal, is the same level as the TE detection level at the TZC point of the TE signal in which asymmetry is adjusted. In other words, the track center level detected in the first embodiment is the same as the track center level detected in the second embodiment.

Accordingly, in the present invention, the track center may be determined based on either the first embodiment or the second embodiment.

Particularly, the apparatus and method for controlling tracking for an optical recording/reproducing apparatus according to the first and second embodiments of the present invention is effective when the TE signal is asymmetrically generated because the optical detector is optically wrong.

As aforementioned, the apparatus and method for controlling tracking for an optical recording/reproducing apparatus according to the present invention has the following advantages.

The track center level is determined at the point where the high width of the TE signal generated during free-running or traverse is equal to its low width. The determined track center level is used for normal recording/reproduction.

Alternatively, the TE detection level at the TZC point of the TE signal in which asymmetry is adjusted is determined as the track center level. This track center level is used for normal recording/reproduction, so that the tracking servo is activated at the actual track center position. Thus, initial stable tracking performance can be obtained, and bias of the tracking can be avoided during tracking control by estimating the exact track center value.

Furthermore, the offset value is obtained from the track center during tracking servo to adjust offset of the TE signal. Thus, it is possible to perform tracking servo at the exact track center position in even case where the TE signal is asymmetrically generated because the optical detector is optically wrong.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for controlling tracking for an optical recording/reproducing apparatus which performs tracking control by detecting a TE signal from electrical signals output in proportional to quantities of reflected light from an optical pickup, the method comprising the steps of:
   (a) varying and slicing a slice level for a TE signal detected at the time when recording and reproduction of a normal state are not performed;
   (b) determining a slice level as a track center level at a point where a high width of the sliced signal is equal to its low width; and
   (c) utilizing the determined track center level in recording and reproduction of a normal state.

2. The method of claim 1, wherein the step (a) is performed for only a TE signal greater than a constant frequency.

3. The method of claim 1, wherein the step (c) includes the step of activating a tracking servo in the determined track center.

4. The method of claim 1, wherein the step (c) includes the step of performing the tracking servo with compensating a difference between a level of the determined track center and a peak-to-peak center level of the TE signal.

5. The method of claim 1, wherein the step (c) includes the step of performing the tracking servo with compensating a difference between a level of the determined track center and a traverse center level of the TE signal.

6. A method for controlling tracking for an optical recording/reproducing apparatus which performs tracking control by detecting a TE signal from electrical signals output in proportional to quantities of reflected light from an optical pickup, the method comprising the steps of:
   (a) adjusting asymmetry of a TE signal detected at the time when recording and reproduction of a normal state are not performed;
   (b) determining a level of the TE signal detected at a TZC point of the adjusted TE signal as a track center level; and
   (c) utilizing the determined track center level in the recording and reproduction of a normal state.

7. The method of claim 6, wherein the step (a) includes the steps of:
   DC coupling the TE signal;
   biasing the DC coupled TE signal at a reference voltage; and
   slicing the biased TE signal at the reference voltage.

8. The method of claim 7, wherein the reference voltage is a servo reference voltage.

9. The method of claim 7, wherein the reference voltage is fixed.

10. The method of claim 6, wherein the step (c) includes the step of activating a tracking servo in the track center.

11. The method of claim 6, wherein the step (c) includes the steps of performing the tracking servo with compensating a difference between a level of the determined track center and a peak-to-peak center level of the TE signal.

12. The method of claim 6, wherein the step (c) includes the step of performing the tracking servo with compensating a difference between a level of the determined track center and a traverse center level of the TE signal.

13. An apparatus for controlling tracking for an optical recording/reproducing apparatus which performs tracking control by detecting a TE signal from electrical signals output in proportional to quantities of reflected light from an optical pickup, the apparatus comprising:
   a slicing unit for varying and slicing a slice level for a TE signal detected at the time when recording and reproduction of a normal state are not performed;
   a servo control unit for determining a slice level as a track center level at a point where a high width of the sliced signal is equal to its low width and obtaining a tracking offset to be adjusted; and
   a tracking servo driving unit for utilizing the track center level determined by the servo control unit and the TE signal in which the tracking offset is adjusted.

14. The apparatus of claim 13, wherein the slicing unit performs slicing for only a TE signal greater than a constant frequency.

15. The apparatus of claim 13, wherein the tracking servo driving unit activates a tracking servo in the determined track center.

16. The apparatus of claim 13, wherein the servo control unit performs the tracking servo with compensating a difference between a level of the determined track center and a peak-to-peak center level of the TE signal.

17. An apparatus for controlling tracking for an optical recording/reproducing apparatus which performs tracking control by detecting a TE signal from electrical signals output in proportional to quantities of reflected light from an optical pickup, the apparatus comprising:
   an asymmetric adjusting unit for adjusting asymmetry of a TE signal detected at the time when recording and reproduction of a normal state are not performed;
   a servo control unit for setting a level of the TE signal detected at a TZC point of the adjusted TE signal as a track center level and obtaining a tracking offset to be adjusted; and
   a tracking servo driving unit for utilizing the track center level determined by the servo control unit and the TE signal, in which the tracking offset is adjusted, in the recording and reproduction of a normal state.

18. The apparatus of claim 17, wherein the asymmetric adjusting unit includes:
   a capacitance for DC coupling the TE signal;
   a buffer for biasing the DC coupled TE signal at a reference voltage; and
   a comparator for slicing the biased TE signal at the reference voltage to generate a TZC signal.

19. The apparatus of claim 17, further comprising an offset compensator for compensating a difference between a level of the track center detected at the TZC point and a level of a peak-to-peak center of the TE signal detected from the electrical signals in proportional to quantities of reflected light from the pick up.

20. The apparatus of claim 17, wherein the tracking servo driving unit activates the tracking servo in the determined track center.

* * * * *